United States Patent
Lee (10) Patent No.: US 10,681,417 B2
(45) Date of Patent: Jun. 9, 2020

(54) ENHANCED MULTICAST NETWORK COMMUNICATIONS

(71) Applicant: Google LLC, Mountain View, CA (US)

(72) Inventor: Jiwoong Lee, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/593,447

(22) Filed: May 12, 2017

(65) Prior Publication Data

US 2018/0332351 A1   Nov. 15, 2018

(51) Int. Cl.
*H04N 21/6402*   (2011.01)
*H04N 21/4627*   (2011.01)
(Continued)

(52) U.S. Cl.
CPC ....... *H04N 21/4627* (2013.01); *H04L 12/185* (2013.01); *H04L 12/1859* (2013.01);
(Continued)

(58) Field of Classification Search
CPC ........... H04N 21/4627; H04N 21/6405; H04N 21/6402; H04N 21/6408; H04L 45/16;
(Continued)

(56) References Cited

U.S. PATENT DOCUMENTS 5,361,256 A * 11/1994 Doeringer ........... H04L 12/1836
370/390
5,608,726 A * 3/1997 Virgile ................ H04L 12/1886
370/401

(Continued)

FOREIGN PATENT DOCUMENTS

WO   WO 2009/064165   5/2009

OTHER PUBLICATIONS

PCT International Search Report and Written Opinion issued in International Application No. PCT/US2018031776, dated Jul. 2, 2018, 13 pages.

(Continued)

*Primary Examiner* — Nasser M Goodarzi
*Assistant Examiner* — Patrick A Ryan
(74) *Attorney, Agent, or Firm* — Honigman LLP; Brett A. Krueger (57) ABSTRACT

Methods, systems, apparatus, including computer programs encoded on computer storage media, for generating and routing modified multimedia data frames. In one aspect, the method includes maintaining, by a first network node, channel membership data that includes data indicating, for each channel of a plurality of channels, leaf node membership for a plurality of channels, and for each channel of the plurality of channels: determining, based on the channel membership data, the leaf nodes that are subscribed to access the channel, generating, based on the leaf nodes that are subscribed to access the channel, a modified multimedia data frame for the channel that includes (i) a hub node identifier, (ii) data that describes a destination address of each leaf node that is subscribed to access the channel and (iii) a payload, and transmitting, by the first network node, the generated modified multimedia data frame to a second network node.

15 Claims, 4 Drawing Sheets

(51) Int. Cl.
*H04N 21/6405* (2011.01)
*H04N 21/6408* (2011.01)
*H04L 29/06* (2006.01)
*H04L 12/18* (2006.01)
*H04W 76/10* (2018.01)

(52) U.S. Cl.
CPC ...... *H04L 12/1886* (2013.01); *H04L 65/4076* (2013.01); *H04L 69/22* (2013.01); *H04N 21/6402* (2013.01); *H04N 21/6405* (2013.01); *H04N 21/6408* (2013.01); *H04W 76/10* (2018.02)

(58) Field of Classification Search
CPC ..... H04L 45/00; H04L 69/22; H04L 12/1854; H04L 12/185; H04W 76/10
See application file for complete search history.

(56) References Cited

U.S. PATENT DOCUMENTS

| | | | | |
|---|---|---|---|---|
| 6,873,627 B1* | 3/2005 | Miller | ............... | H04L 1/1614 370/432 |
| 6,957,277 B2* | 10/2005 | Yagyu | ............... | H04L 12/1836 370/389 |
| 7,961,646 B2 | 6/2011 | Liu et al. | | |
| 8,619,662 B2* | 12/2013 | Kish | ............... | H04W 4/06 370/312 |
| 2006/0018335 A1* | 1/2006 | Koch | ............... | H04L 12/18 370/432 |
| 2006/0187950 A1 | 8/2006 | Bou-Diab et al. | | |
| 2009/0262677 A1* | 10/2009 | Banerjea | ............... | H04L 12/1877 370/312 |
| 2012/0147885 A1 | 6/2012 | Johri et al. | | |
| 2016/0134518 A1* | 5/2016 | Callon | ............... | H04L 45/24 370/390 |
| 2016/0142248 A1* | 5/2016 | Thubert | ............... | G06F 16/2237 370/392 |
| 2017/0078188 A1 | 3/2017 | Allan | | |

OTHER PUBLICATIONS

PCT International Preliminary Report on Patentability in International Application No. PCT/US2018/031776, dated Nov. 12, 2019, 8 pages.

* cited by examiner

ENHANCED MULTICAST NETWORK COMMUNICATIONS

BACKGROUND

Conventional networked communication of data frames in a Media Access Control (MAC) layer typically includes either unicast or multicast communications. Each form of data frame communication has known drawbacks. Because of these drawbacks, an alternative form of communication is required that accommodates generation and routing of data frames for services consuming large amounts of bandwidth such as television (TV) streaming services.

SUMMARY

Methods, systems, apparatus, including computer programs encoded on computer storage media, for generating and routing modified multimedia data frames. In one aspect, the method may include actions of maintaining, by a first network node, channel membership data that includes data indicating, for each channel of a plurality of channels, leaf node membership for a plurality of channels, and for each channel of the plurality of channels: determining, based on the channel membership data, the leaf nodes that are subscribed to access the channel, generating, based on the leaf nodes that are subscribed to access the channel, a modified multimedia data frame for the channel that includes (i) a hub node identifier, (ii) data that describes a destination address of each leaf node that is subscribed to access the channel and (iii) a payload, and transmitting, by the first network node, the generated modified multimedia data frame to a second network node.

Other versions include corresponding systems, apparatus, and computer programs to perform the actions of methods, encoded on computer storage devices.

These and other versions may optionally include one or more of the following features. For instance, in some implementations, the modified multimedia data frame includes a unicast data frame comprising a MAC Header and a payload and the MAC Header includes a destination address field.

In some implementations, generating a modified multimedia data frame may include encoding a destination address for each leaf node that is subscribed to access the channel into an encoded bitmap of destination addresses, and populating the destination address field with the encoded bitmap of destination addresses.

In some implementations, the method may include receiving, by the second network node, at least one of the modified multimedia data frames, identifying, by the second network node based on the encoded bitmap of destination addresses, a number of subsequent network nodes that are a destination of the at least one modified multimedia data frame, and in response to determining that the number of subsequent network nodes is greater than one network node, generating a modified multimedia data frame that includes (i) data that describes a destination address of each of the subsequent network nodes and (ii) a copy of the payload.

In some implementations, the method may include receiving, by the second network node, at least one of the modified multimedia data frames, identifying, by the second network node based on the encoded bitmap of destination addresses, a number of subsequent network nodes that are a destination of the at least one modified multimedia data frame, and in response to determining that the number of subsequent network nodes is equal to one network node, generating a unicast data frame that includes (i) data that describes a destination address of the one subsequent network node and (ii) a copy of the payload.

DETAILED DESCRIPTION

The present disclosure is directed towards a system and method for broadcasting multimedia data frames such as television (TV) data frames. The present disclosure achieves advantages over conventional methods by generating modified multimedia data frames for use in conjunction with one or more membership table exchanges that may include, for example, data mapping a bitmap address to leaf network nodes. A modified multimedia data frame may include, for example, a unicast data frame used to communicate data that is generated using a compact addressing scheme to encode data describing a destination address for each leaf network node of multiple leaf network nodes into a bitmap of destination addresses that can be inserted into the destination address field of the unicast data frame. The modified multimedia data frame and the membership table exchange allow for a reduction in bandwidth required to stream content such as TV content in relation to conventional unicast transmissions. Moreover, the modified multimedia data frame and membership exchange tables also allow for multicast-like data frame broadcasting using a unicast data frame that avoids the expensive process of frequent recalculation of multicast spanning trees required by conventional multicast broadcasting.

Figure 1:
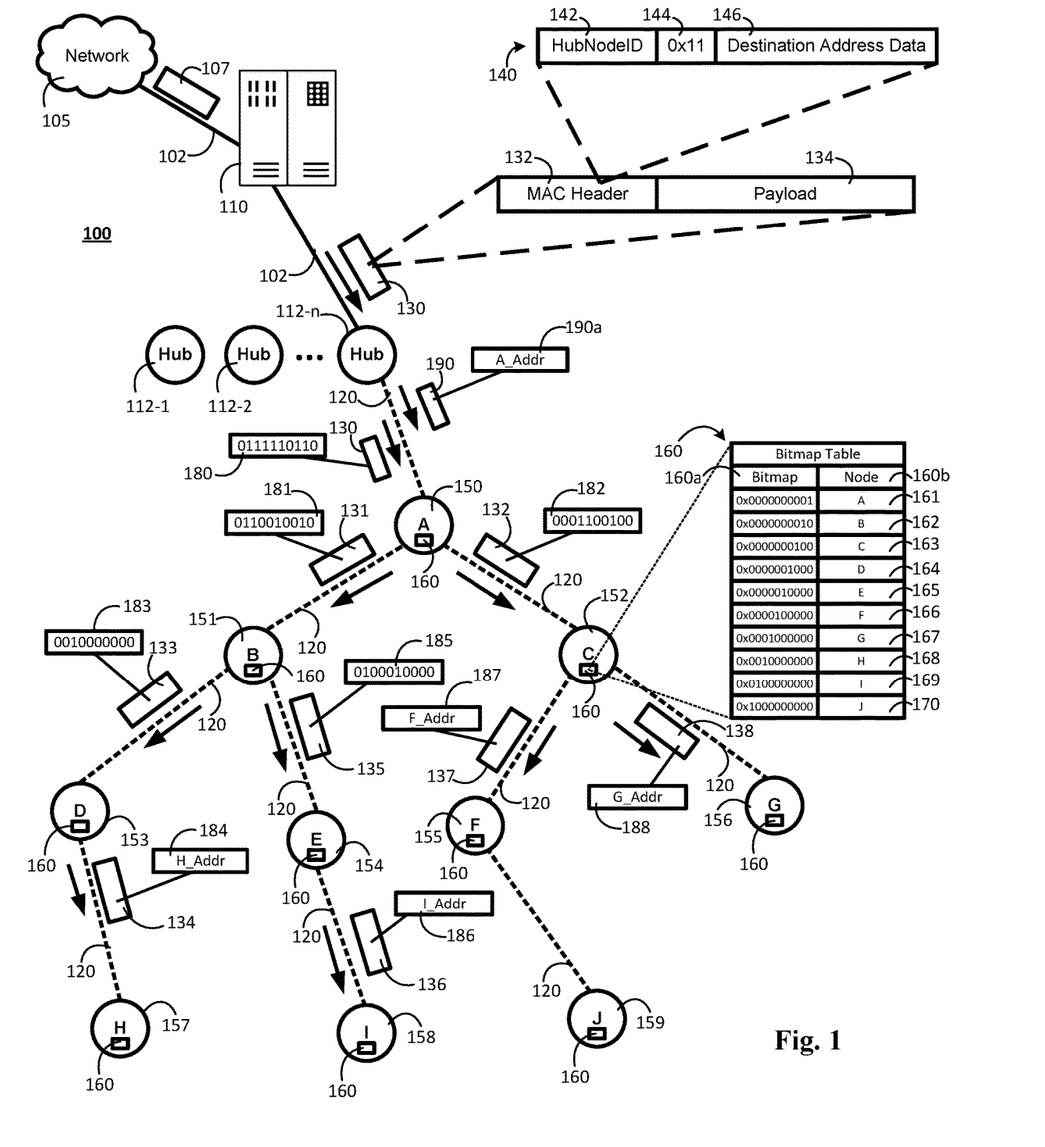
FIG. 1 is a contextual diagram of an example of a system for generating and routing modified multimedia data frames.

FIG. 1 is a contextual diagram of an example of a system 100 for generating and routing modified multimedia data frames. The system 100 includes a network 105, a plurality of network nodes including a primary node 110, one or more hub nodes 112-1, 112-2, 112-n (where n is any positive integer between 1 and 64), a wireless mesh network 120, and multiple leaf nodes "A" 150, "B" 151, "C" 152, "D" 153, "E" 154, "F" 155, "G" 156, "H" 157, "I" 158, "J" 159.

The primary node 110 is a network node that is positioned between a network 105 such as the Internet and one or more hub nodes 112-1, 112-2, 112-n. The primary node 110 receives data such as wired data frames 107 across a wired connection 102 and generates wireless data frames, wired data frames, or both, for transmission to a wireless hub 112-1, 112-2, 112-n. The primary node may include, for example, a fiber hut, an optical network unit, a multimedia feed server, a TV feed server, or the like. The primary node 110 may act as a relay that routes data received as one or more signals such as light signals to a corresponding hub node. A hub node 112-1, 112-2, 112-n is a network node that is positioned between the primary node 110 and a set of one or leaf nodes "A" 150, "B" 151, "C" 152, "D" 153, "E" 154, "F" 155, "G" 156, "H" 157, "I" 158, "J" 159. Each respective hub node 112-1, 112-2, 112-n groups incoming data lines such as fiber lines into bundles corresponding to a set of one or more leaf nodes "A" 150, "B" 151, "C" 152, "D" 153, "E" 154, "F" 155, "G" 156, "H" 157, "I" 158, "J" 159.

The primary node 110 is configured to maintain channel subscription data. The channel subscription data may include data describing leaf node membership with respect to each channel of a plurality of channels. In some implementations, the channel subscription data may be maintained on a per-channel basis using a table. The channel subscription data may be accessed to determine, for each channel, the network nodes such as leaf nodes "A" 150, "B" 151, "C" 152, "D" 153, "E" 154, "F" 155, "G" 156, "H" 157, "I" 158, "J" 159 that are members of the channel. A network node may be a member of a channel if, for example, the network node has a subscription that allows the network node to access content provided by the channel. Access to content provided by the channel may include, for example, access to view the content provided by the channel. A channel may include, for example, a TV channel. Alternatively, a channel may include, for example, an internet multimedia channel such as a YouTube channel.

The primary node 110 is configured to generate multiple modified multimedia data frames 130. For example, the primary node 110 may generate a modified multimedia data frame 130 per hub node 112-1, 112-2, 112-n for each channel of the plurality of channels offered by a particular streaming server. Alternatively, or in addition, a primary node 110 may generate a modified multimedia data frame 130 in response to a request from a network node for content from a particular channel.

The modified multimedia data frame 130 includes a unicast data frame for communication in the Media Access Control (MAC) layer that includes a MAC header 132 and a payload 134. The MAC header 132 of the modified multimedia data frame 130 includes a destination address field 140. The destination address field 140 of the modified multimedia data frame 130 distinguishes the modified multimedia data frame 130 from a conventional unicast data frame. The modified multimedia data frame 130 includes a HubNodeID 142, a constant 144, and destination address data 146. The HubNodeID 142 is used to identify a hub node 112-1, 112-2, 112-n where the modified multimedia data frame 130 should be routed. The constant 144 is used to indicate that (i) the destination address data 146 is a locally administered address, (ii) the data frame is a modified multimedia data frame, or (iii) both.

The destination address data 146 includes data that represents the destination address of each leaf node of the multiple leaf nodes that are a destination for the payload of the modified multimedia data frame 130. This is different from a conventional unicast data frame which may include only a single destination address of the single node that is the only destination of the conventional unicast data frame. The destination address data 146 may be created when the multimedia data frame 130 is generated. In some implementations, the primary node 110 may generate the modified multimedia data frame 130 by encoding data describing the destination address for each leaf node into a bitmap of destination addresses that is inserted into the destination address data field 146 of the destination address field 140 of the MAC header 132.

The encoding of each destination address of each destination node of the plurality of destination nodes where the payload of the modified multimedia data frame should be routed into the destination address field 140 of a MAC header 132 results in a system that uses network bandwidth more efficiently. This is because instead of using multiple unicast data frames to transmit multimedia content data to multiple respective nodes of a network, a single modified multimedia data frame 130 can be used to transmit multimedia content to multiple nodes of the mesh network 120. This reduces network traffic, increases available bandwidth, and allows for the transmission of additional data using the available bandwidth.

In some implementations, the destination address field 140 of the MAC header 132 includes 6 bytes comprised of 48 bits. The least significant two bits of the most significant byte may be frozen to a constant such as 0x11. The rest of the 6 bits of the most significant byte is a HubNodeID 12 that may be used to identify a particular hub node 112-1, 112-2, 112-n under the primary node 110. Each bit of the remaining 5 bytes is one-to-one mapped to a leaf node under a hub node identified by the HubNodeID 142 of the destination address field 140. In such implementations, the one-to-one mapping established by the remaining 40 bits will result in 40 leaf nodes that can be addressed for each hub node 112-1, 112-2, 112-n. Therefore, this addressing scheme should generally support $2^6 * 40 = 2560$ nodes within a wireless topology under a primary node. The mapping of leaf nodes to a particular bit in a 40-bit bitmap is shared by the primary node 110 with each leaf node ahead of time and does not change during the lifetime of a neighborhood topology. That is, the mapping of leaf nodes to a particular bit in a 40-bit bitmap may be updated, for example, only when there is a permanent change in the node membership such as when a new subscriber initiates a new subscription, which can be a relatively rare event. This quasi-static state of the mapping of leaf nodes to a particular bit in a 40-bit bitmap increases efficiency over conventional multicasting communication which would require dynamic recalculation of spanning trees for each channel change.

The primary node 110 may route the modified multimedia data frame 130 to the hub node 112-n that is identified by the HubNodeID 142 of modified multimedia data frame 130. Then, the hub node 112-n may forward the modified multimedia data frame 130 to a first leaf node such as leaf node "A" 150 of the leaf node network that the hub node 112-n is associated with. Each leaf node "A" 150, "B" 151, "C" 152, "D" 153, "E" 154, "F" 155, "G" 156, "H" 157, "I" 158, "J" 159 is representative of a potential data frame destination point such as a receiving unit (e.g., set-top-box, television, desktop computer, laptop computer, smartphone, or the like) at the subscriber's home, office, or other location.

A "leaf node" is a node that (i) receives, as a destination endpoint, a modified multimedia data frame and processes the modified multimedia data frame to obtain and use the payload of the multimedia data frame and (ii) transmits, as necessary, modified multimedia data frames to one or more other nodes, which may include another leaf node or a node that is not a leaf node. However, some "leaf nodes" such as leaf nodes "H" 157, "I" 158, "J" 159, and "G" 156, though capable of performing both the receiving and transmitting of modified multimedia data frames may be positioned in a network at a particular point in time such that it is not necessary for leaf nodes "H" 157, "I" 158, "J" 159, and "G" 156 to transmit any modified multimedia data frames. For example, just because leaf nodes "H" 157, "I" 158, "J" 159, and "G" 156 reside in a particular network configuration at a particular point in time where they do not transmit modified multimedia data frames to other leaf nodes (e.g., because there are no leaf nodes that are hierarchically arranged after leaf nodes "H" 157, "I" 158, "J" 159, and "G" 156) does not mean that such leaf nodes cannot transmit modified multimedia data frames, have not transmitted modified multimedia data frames in the past, or will not transmit modified multimedia data frames in the future.

For example, the mesh network 120 could be reconfigured at some point in the future resulting in one or more leaf nodes being hierarchically arranged after leaf nodes "H" 157, "I" 158, "J" 159, and "G" 156. Under such a scenario, instances may arise where one or more of leaf nodes "H" 157, "I" 158, "J" 159, and "G" 156 transmit modified multimedia data frames. With references to a different example, it is also possible that the mesh network 120 may have been configured differently in the past such that one or more of leaf nodes "H" 157, "I" 158, "J" 159, and "G" 156 may have had one or more leaf network nodes that were hierarchically arranged after the leaf nodes "H" 157, "I" 158, "J" 159, and "G" 156. In such instance, one or more of leaf nodes "H" 157, "I" 158, "J" 159, and "G" 156 would have been able to transmit modified multimedia data frames to the other leaf nodes hierarchically arranged after "H" 157, "I" 158, "J" 159, and "G" 156.

Each leaf node may store a membership exchange table such as a bitmap table 160 that can be used to route modified multimedia data frames such as modified multimedia data frame 130. The bitmap table 160 may be generated by the primary node 110 and then be distributed by the primary node 110 to each respective leaf node "A" 150, "B" 151, "C" 152, "D" 153, "E" 154, "F" 155, "G" 156, "H" 157, "I" 158, "J" 159. In some implementations, the bitmap table 160 may be shared in a pure JavaScript Object Notation (JSON) format. The JSON format may be shared in a file, via protocol buffer, or a remote procedure call (RPC) from the primary node 110 to each respective leaf node. This table is only updated upon a change in the subscription status of a leaf node with respect to one or more channels such as a leaf node initiating a subscription, a leaf node cancelling a subscription, or the like.

In some implementations, a leaf node subscription cancellation may be ignored (and the bitmap table 160 not updated) because the primary node 110 will not transmit modified multimedia data frames to a leaf node that does not have a subscription. Accordingly, the system 100 can wait to update the bitmap table to remove one or more leaf nodes until a later point in time when one or more new leaf nodes have initiated a subscription.

The bitmap table 160 includes a bitmap address for each leaf node that is hierarchically organized under a particular hub node such as hub 112-n. Each row of the bitmap table 160 includes a bitmap address 160a to leaf node 160b mapping 161, 162, 163, 164, 165, 166, 167, 168, 169, 170. A leaf node can then compare (i) a set of destination addresses that have been encoded into a bitmap of destination addresses received in a modified multimedia data frame 130 to (ii) the bitmap address 160a of each leaf node in the bitmap table 160 to determine each of the set of leaf nodes that are a destination for the modified multimedia data frame 130.

In some implementations, each respective leaf node "A" 150, "B" 151, "C" 152, "D" 153, "E" 154, "F" 155, "G" 156, "H" 157, "I" 158, "J" 159 that receives a bitmap table 160 can create a bitmask-to-next hop table that can be used to facilitate fast and efficient branching operations. The bitmask-to-next leaf node table can precompute each possible routing destination for a received bitmap of destination addresses. This makes branching operations more efficient than just using the bitmap table 160 because destination routes for a given bitmap of destination addresses are predetermined and do not need to be computed using the bitmap table 160 in real time.

By way of example, the leaf node "A" 150 may receive a modified multimedia data frame 130 and begin performance of a branching operation to route the modified multimedia data frame 130 to its target destination nodes. The leaf node "A" 150 can begin performance of the branching operation by analyzing the destination address data 146 in view of the bitmap table 160 stored at each leaf node. Analyzing the destination address data 146 may include comparing the destination address data 146 obtained from the modified multimedia data frame 130 to the data maintained by the bitmap table 160.

The multimedia data frame 130 may include a bitmap of destination addresses. That is, each bit of the bitmap of destination addresses can indicate whether or not a particular leaf node is a destination of the modified multimedia data frame 130. For example, assume that the multimedia data frame 130 received at leaf node "A" 150 includes a bitmap of destination addresses such as "0111110110" 180. Using the bitmap table 160, leaf node "A" 150 can determine that the bitmap of destination addresses such as "0111110110" 180 indicates that leaf nodes "B" 151, "C" 152, "E" 154, "F" 155, "G" 156, "H" 157, and "I" 158 are destinations of the modified multimedia data frame 130. Accordingly, leaf node "A" 150 can determine that the leaf node "A" 150 is not a destination of modified multimedia data frame 130 and perform necessary routing operations to transmit the payload associated with the modified multimedia data frame 130 to leaf nodes "B" 151, "C" 152, "E" 154, "F" 155, "G" 156, "H" 157, and "I" 158.

The leaf node "A" 150 continues to perform routing of the modified multimedia data frame 130 by grouping leaf node destinations by the one or more next leaf node destinations. For example, the leaf node "A" 150 may determine, based on the bitmap of destination addresses encoded into the destination address field of the modified multimedia data frame, that the next leaf node destinations include leaf node "B" 151 and leaf node "C" 152. In some implementations, this stage of determining the next leaf node destinations may include providing the bitmap of destination addresses included in the received modified multimedia data frame 130 to a function that accesses a bitmask-to-next leaf node table and returns one or more next leaf nodes where the modified multimedia data frame should be routed. Alternatively, the next leaf node destinations can be computed by comparing the bitmap of destination addresses to the bitmap table 160. The leaf node "A" 150 can then group each of the remaining destination addresses into either a leaf node "B" 151 category or a leaf node "C" 152 category. In further view of the example described above, the leaf node "A" 150 may group the destination address for leaf node "H" 157, leaf node "E" 154, and leaf node "I" 158 into the leaf node "B" 151 category and group the destination addresses for leaf node "F" 155 and leaf node "G" 156 into the leaf node "C" 152 category.

The leaf node "A" 150 determines whether each of the one or more next leaf node destinations such as leaf node "B" 151 and leaf node "C" 152 are the final leaf node destinations. The leaf node "A" 150 may determine whether each of the one or more next leaf nodes destinations is a final leaf node destination by determining whether the number of leaf node destinations is greater than one leaf node destination. If the number of remaining leaf node destinations is greater than one, the leaf node "A" 150 may determine that the next leaf node destination is not a final destination node. If the number of remaining leaf node destinations is equal to one, leaf node "A" 150 may determine that the next leaf node destination is a final leaf node destination.

The leaf node "A" 150 may determine that the leaf node "B" category and leaf node "C" category each include more than one leaf node destination address and are therefore not final leaf node destinations. In response to determining that leaf node "B" 151 and leaf node "C" 152 are not final leaf node destinations, the leaf node "A" 150 generates a new modified multimedia data frame 131 and a new modified multimedia data frame 132. Alternatively, under a different scenario (e.g., a different received modified multimedia data frame 132), a leaf node such as leaf node "A" 150 may instead determine that one or more next leaf nodes is a final leaf node destination for a modified multimedia data frame. In such instances, the leaf node "A" 150 may generate a unicast data frame for transmission to the final leaf node destination. Such an alternative is discussed in more detailed below with reference to the example of FIG. 1.

The modified multimedia data frame 131 is generated in a manner that is similar to the generation of modified multimedia data frame 130. Specifically, modified multimedia data frame 131 is a duplicate of the modified multimedia data frame 130 except with respect to the destination address data that is encoded into the destination address field of modified multimedia data frame 131. For example, leaf node "A" 150 will only encode the set of destination addresses in the leaf node category "B" into the destination address field of the modified multimedia data frame 131. This results in the leaf node "A" 150 generating a bitmap of destination addresses "0110010010" 181. The bitmap of destination addresses "0110010010" 180 indicates that modified multimedia data frame 131 should be routed to leaf node destinations that include "B", "E", "H", "I". The modified multimedia data frame 131 can then be routed to leaf node "B" 151. Upon receipt of the modified multimedia data frame 131, leaf node "B" 151 performs branching operations.

The modified multimedia data frame 132 is also generated by leaf node "A" 150 in a manner that is similar to the generation of modified multimedia data frame 130. Specifically, modified multimedia data frame 132 is a duplicate of the modified multimedia data frame 130 except with respect to the destination address data that is encoded into the destination address field of modified multimedia data frame 132. For example, leaf node "A" 150 will only encode the set of destination addresses in the leaf node category "C" into the destination address field of the modified multimedia data frame 132. This results in the leaf node "A" 150 generating a bitmap of destination addresses "0001100100" 182. The bitmap of destination addresses "0001100100" 182 indicates that modified multimedia data frame 132 should be routed to leaf node destinations that include "C", 152 "F" 155, and "G" 156. The modified multimedia data frame 132 can then be routed to leaf node "C" 151. Upon receipt of the modified multimedia data frame 132, leaf node "C" 152 performs branching operations.

The leaf node "B" 151 may receive the modified multimedia data frame 131 and perform branching operations in a manner similar to leaf node "A" 150. Branching includes the leaf node "B" grouping subsequent leaf node destinations identified by the destination address field 181 of the modified multimedia data frame 131. For example, the leaf node "B" 151 may determine that the next leaf node destinations include leaf node "H" 157 and leaf node "E" 154. In some implementations, this stage of determining the next leaf node destinations may include providing the bitmap of destination addresses included in the received modified multimedia data frame 131 to a function that accesses a bitmask-to-next leaf node table and returns one or more next leaf nodes where the modified multimedia data frame should be routed. Alternatively, the next leaf node destinations can be computed by comparing the bitmap of destination addresses to the bitmap table 160. The leaf node "B" 151 can then group each of the remaining destination addresses into either a leaf node "H" 157 category or a leaf node "E" 154 category. In further view of the example described above, the leaf node "B" 151 may group the destination address for leaf node "H" 157 into the leaf node "H" 157 category and group the destination addresses for leaf node "E" 154 and leaf node "I" 158 into the leaf node "E" 154 category.

The leaf node "B" 151 determines whether each of the one or more next leaf node destinations such as leaf node "H" 157 and leaf node "E" 154 is a final leaf node destination. The leaf node "B" 151 may determine whether a particular leaf node destination is a final leaf node destination by determining whether the number of leaf node destinations is greater than one leaf node destination. If the number of remaining leaf node destinations is greater than one, the leaf node "B" 151 may determine that the next leaf node destination is not a final destination node. If the number of remaining leaf node destinations is equal to one, leaf node "B" 151 may determine that the next leaf node destination is a final leaf node destination.

The leaf node "B" 150 may determine that the leaf node "H" category includes only one leaf node destination address and is therefore a final leaf node destination. In this instance, since the next node (i.e., node "D") of the mesh network of the "H" category is not the final destination node of the message 133, the leaf node "B" 150 generates a modified multimedia data frame 133 with an address of "0010000000" 183 and transmits the modified multimedia data frame 133 to node "D".

The node "D" receives the modified multimedia data frame 133 and perform branching operations in a manner similar to leaf node "A" 150 and leaf node "B" 151 prior. For example, leaf node "D" 153 may determine that the next leaf node destination is leaf node "H" 157. In some implementations, this stage of determining the next leaf node destinations may include providing the bitmap of destination addresses included in the received modified multimedia data frame 133 to a function that accesses a bitmask-to-next leaf node table and returns one or more next leaf nodes where the modified multimedia data frame should be routed. Alternatively, the next leaf node destinations can be computed by comparing the bitmap of destination addresses to the bitmap table 160. In this branching operation, the leaf node "D" 153 can determine that there are no other leaf node destination addresses in the bitmap of destination addresses beyond leaf node "H" 157.

Grouping the leaf node destination addresses results in a single leaf node "H" 157 category that includes a single leaf node destination. The leaf node "D" 153 can determine that the leaf node "H" 157 category only includes a single leaf node destination address. In response to determining that leaf node "H" 157 category only includes a single leaf node destination address, the leaf node "D" 153 generates a new unicast message 134 for transmission to a final leaf node destination of leaf node "H" 157. The destination address field of the unicast data frame 134 includes an address "H_Addr" 184 of the leaf node "H" 157. The address "H_Addr" is the particular address of the leaf node "H" 157. The unicast data frame 134 is transmitted by leaf node "D" 153 to leaf node "H" 157.

Separately, the leaf node "B" 151 may determine that the leaf node "E" 154 category includes more than one leaf node destination address and is therefore not a final leaf node destination. In response to determining that the leaf node "E" 154 is not a final leaf node destination for the modified multimedia data frame 131, the leaf node "B" 151 generates a new modified multimedia data frame 135.

The modified multimedia data frame 135 is generated in a manner that is similar to the generation of modified multimedia data frame 131. Specifically, modified multimedia data frame 135 is a duplicate of the modified multimedia data frame 131 except with respect to the destination address data that is encoded into the destination address field of modified multimedia data frame 135. For example, leaf node "B" 151 will only encode the set of destination addresses identified as being associated with the leaf node category "E" into the destination address field of the modified multimedia data frame 135. This results in the leaf node "B" 151 generating a bitmap of destination addresses "0100010000" 185 for inclusion in the destination address field of the modified multimedia data frame 135. The bitmap of destination addresses "0100010000" 185 indicates that modified multimedia data frame 135 should be routed to leaf node destinations that include leaf node "E" 154 and leaf node "I" 158. The modified multimedia data frame 135 can then be routed to leaf node "E" 154. Upon receipt of the modified multimedia data frame 135, leaf node "E" 154 performs branching operations.

The leaf node "E" 154 receives the modified multimedia data frame 135 and performs branching operations in a manner similar to leaf node "A" 150 and leaf node "B" 151 prior. For example, leaf node "E" 154 may determine that the next leaf node destination is leaf node "I" 158. In some implementations, this stage of determining the next leaf node destinations may include providing the bitmap of destination addresses included in the received modified multimedia data frame 135 to a function that accesses a bitmask-to-next leaf node table and returns one or more next leaf nodes where the modified multimedia data frame should be routed. Alternatively, the next leaf node destinations can be computed by comparing the bitmap of destination addresses to the bitmap table 160. In this branching operation, the leaf node "E" 154 can determine that there are no other leaf node destination addresses in the bitmap of destination addresses beyond leaf node "I" 158.

Grouping the leaf node destination addresses results in a single leaf node "I" 158 category that includes a single leaf node destination. The leaf node "E" 154 can determine that the leaf node "I" 158 category only includes a single leaf node destination address. In response to determining that leaf node "I" 158 category only includes a single leaf node destination address, the leaf node "E" 154 generates a new unicast message 136 for transmission to a final leaf node destination of leaf node "I" 158. The destination address field of the unicast data frame 136 includes an address "I_Addr" 186 of the leaf node "I" 158. The address "I_Addr" is the particular address of the leaf node "I" 158. The unicast data frame 136 is transmitted by leaf node "E" 154 to leaf node "I" 158.

The aforementioned description of the branching operations performed by the one or more leaf network nodes in the network system 100 provides an example of how the system 100 routes modified multimedia data frames from a primary node to a respective hub node and through a configuration of leaf nodes. The same process may be used to route multimedia data frame data frames through the remaining leaf nodes of FIG. 1. For example, the leaf node "A" 150 may transmit the modified multimedia data frame 132 to the leaf node "C". The leaf node "C" 152 performs branching operations, and generates respective unicast data frames 137 and 138. Each respective unicast data frame 137 and 138 may include an address for a particular leaf node that is the only destination for the respective unicast data frames 137 and 138. In the example of FIG. 1, the unicast message 137 includes an address of "F_Addr" 187 and the unicast message 138 includes the address of "G_Addr." Then, the unicast data frames 137 and 138 may be transmitted to their respective final destinations of leaf node "F" 155 and leaf node "G" 156, respectively.

The aforementioned routing of modified multimedia data frames provides significant advantages over conventional methods by using a data frame with an address field that has been modified in a manner that allows for multicast-like communication using a unicast data frame. This allows the system 100 to efficiently route modified multimedia data frames without the frequent recalculation of multicast routing spanning trees, which would be required in a multicast broadcasting system in response to frequent link loss in the wireless network and a user's fast channel sweeping while searching from channel-to-channel for a channel the user wants to watch. If a conventional multicast broadcasting system was used, modified multimedia data frames would not be able to reach destination leaf nodes or more than optimal bandwidth would be consumed during recalculation of the routing spanning trees.

The example of FIG. 1 provides an example of a plurality leaf network nodes that are addressed using a 10-bit bitmap. However, the present disclosure provides for a destination address field that can use up to 40-bits. In combination with the 6-bit HubNodeID, this can allow for $2^6*40=2560$ leaf nodes under a single primary node. However, the present disclosure can allow for even greater network sizes. For example, the one or more significant bits of the 40-bit destination address field can be used as a cluster-id. For example, the most significant bit can be used to identify a first cluster node "1" associated with a hub node and a second cluster node "0" identified by the same hub node. Then, the remaining 39 bits can be used to identify 39 nodes under the first cluster node associated with the "1" most significant bit and also 39 nodes under the second cluster node associated with the "0" most significant bit for a total of 78 leaf network nodes under a single hub node. Using the same 6-bit HubNodeID, one could reach $2^6*2^1*39=4,992$ leaf nodes under a single primary node. Routing of modified multimedia data frames using a cluster-id would involve an additional stage of routing the modified multimedia data frame to a corresponding cluster network node identified by the cluster-id by the hub node. Once the modified multimedia data frame is received by the cluster network node, branching operations can be performed using the remaining bits of the destination address data in the manner described above. Accordingly, by apportioning one or more bits of the destination address field for use as a cluster-id, the present disclosure can use a modified multimedia data frame to address greater numbers of leaf network nodes.

The example of FIG. 1 described above includes an example where the leaf node A receives a modified multimedia data frame 130 that includes destination address data 146 includes data that represents the destination address of each leaf node of the multiple leaf nodes that are a destination for the payload of the modified multimedia data frame 130. The destination address data 146 may include, for example, an encoded bitmap of destinations addresses. However, in some instances, leaf node A may be the only destination of a particular data frame. In such instances, a hub nodes such as hub node 112-n may generate a unicast message 190 for transmission to leaf node A that includes the address "A_Addr" 190a. The address "A_Addr" 190a is the particular address of the leaf node "A" 150. The unicast data frame 190 is transmitted by hub node 112-*n* to leaf node "A" 150. In those instances where a leaf node such as leaf node "A" 150 receives unicast message such as unicast message 190, the leaf node "A" 150 will not perform branching.

Figure 2:
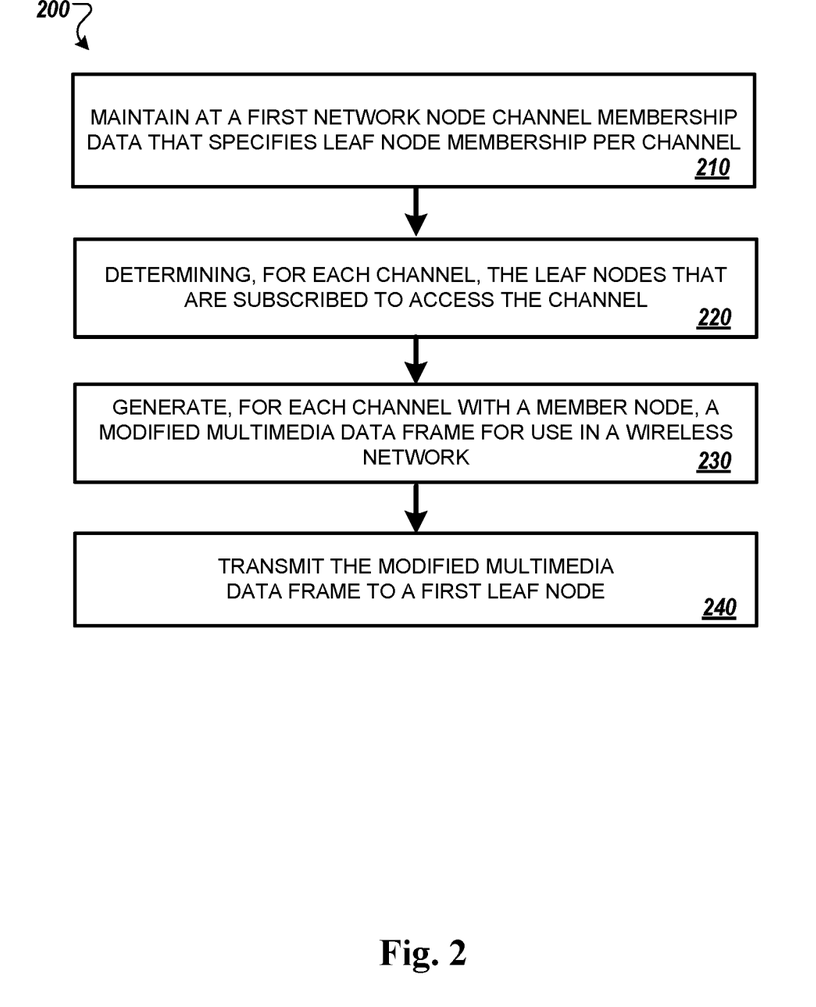
FIG. 2 is a flowchart of an example of a process for generating modified multimedia data frames.

FIG. 2 is a flowchart of an example of a process 200 for generating modified multimedia data frames. For convenience, the process 200 will be described as being performed by a system of one or more computers located in one or more locations. For example, a system such as the system 100 can be appropriately programmed in accordance with this specification to perform the process 200.

The process 200 begins with the system maintaining 210, by a first network node, channel membership data that includes data indicating leaf node membership for each of a plurality of channels. In some implementations, the channel membership data may be maintained using a table on a per-channel basis. The channel subscription data may be used to determine, for each channel, the network nodes that are members of the channel. A leaf network node may have a membership to a channel if, for example, the leaf network node has a subscription that allows the leaf network node to access content provided by the channel. Access to content provided by the channel may include, for example, access to view the content provided by the channel. A channel may include, for example, a TV channel. Alternatively, a channel may include, for example, an internet multimedia channel such as a YouTube channel.

The system determines 220, for each channel of the plurality of channels, whether each of a plurality of leaf network nodes is subscribed to access the channel. Determining whether a leaf node is subscribed to access the channel may include accessing the channel membership data maintained by the first network node. For example, the system can access a channel membership data table and determine whether one or more leaf nodes are listed as being associated with a subscription to access the channel.

The system can generate 230, for each channel with at least one subscribed leaf node, a modified multimedia data frame for use in a wireless network. The generated modified multimedia data frame for the channel is a data structure that includes (i) a hub node identifier, (ii) a constant, (iii) destination address data that describes a destination address for each leaf node that is associated with the channel, and (iv) a payload. The hub node identifier is used to identify a hub node where the generated modified multimedia data frame should be routed. The constant is used to indicate that the destination address data of the modified multimedia data frame is a locally administered address, (ii) the data frame is a modified multimedia data frame, or (iii) both. The payload may include, for example, a portion of content broadcast by the channel.

The destination address data of the modified multimedia data frame is different from the destination address included in a conventional unicast data frame because the destination address data includes data that is a representation of a destination address of each of multiple leaf nodes that are a destination for the payload of the modified multimedia data frame. This is different from a conventional unicast data frame which may include only a single destination address of the single node that is the destination of the conventional unicast data frame. The destination address data may be created when the multimedia data frame is generated. In some implementations, generating the modified multimedia data frame includes encoding data describing the destination address for each leaf node into a bitmap of destination addresses that is used to populate the destination address field of the MAC header.

The system transmits 240, by the first network node, each generated modified multimedia data frame to a second network node. In some implementations, the second network node may include a hub node that is identified by the hub node identifier of the modified multimedia data frame.

The system performing the aforementioned process generates a modified multimedia data frame for each channel that is associated with at least one subscriber. However, there may be instances wherein one or more particular channels do not have any subscribers. In such instances, system can decide to not generate a modified multimedia data frame for the channel.

Figure 3:
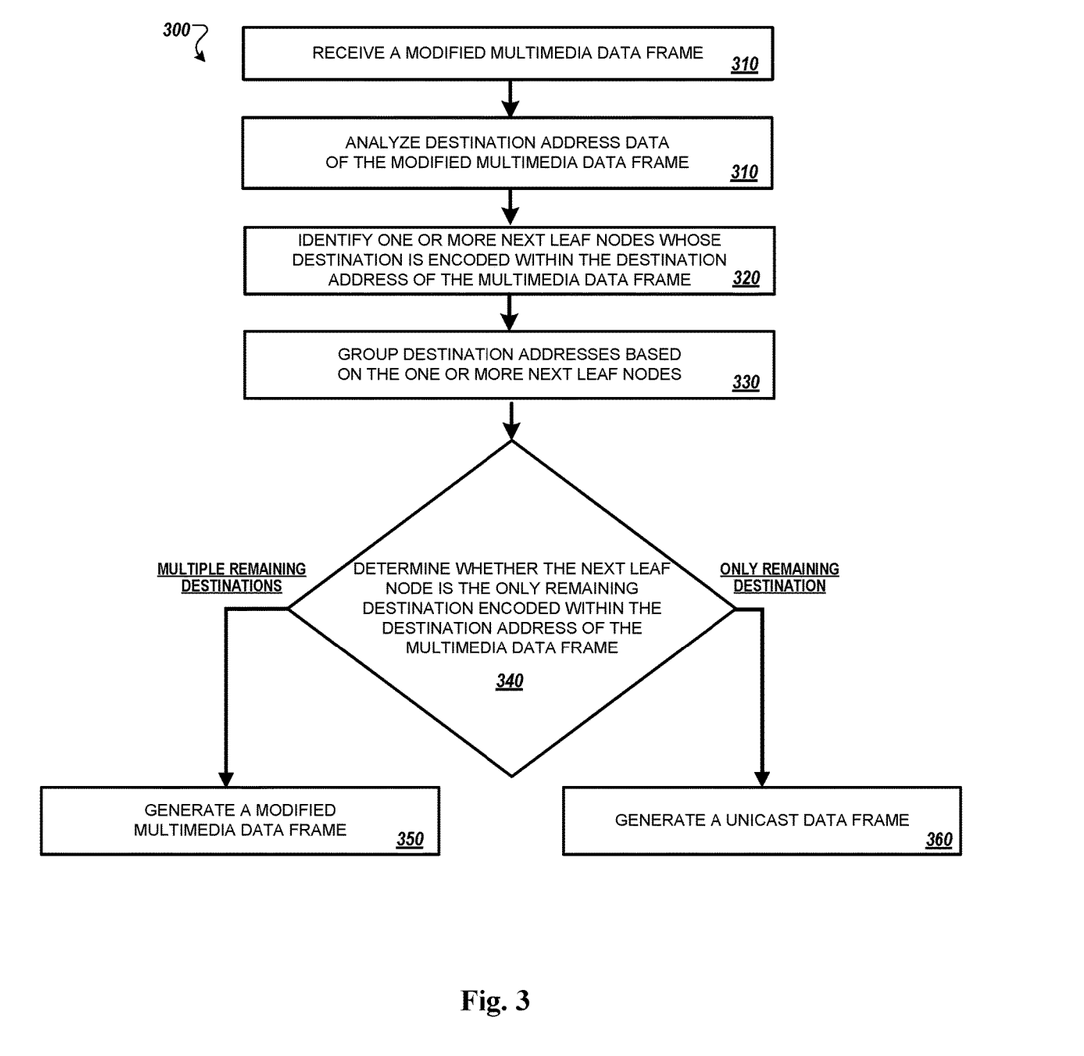
FIG. 3 is a flowchart of an example of a process for routing modified multimedia data frames.

FIG. 3 is a flowchart of an example of a process 300 for routing modified multimedia data frames. For convenience, the process 300 will be described as being performed by a system of one or more computers located in one or more locations. For example, a system such as the system 100 can be appropriately programmed in accordance with this specification to perform the process 300.

The process 300 begins with a leaf network node receiving 310 a modified multimedia data frame. The received modified multimedia data frame is a data structure that includes destination address data that describes a destination address for each leaf node that is associated with the channel. The destination address data may have been created when the multimedia data frame was generated. In some implementations, the destination address data may be encoded as a bitmap of destination addresses for each leaf node that is destination of the multimedia data frame. The leaf network node may initiate branching operations described by stages 320 to 360 below upon receipt of the modified multimedia data frame.

The system analyzes 320 the destination address data of a received modified multimedia data frame. Analyzing 320 the destination address data of a received modified multimedia data frame may include, for example, comparing the destination address data of the received modified multimedia data frame to the data stored in a bitmap table at the leaf network node. The leaf network node may use the bitmap table to determine each of the one or more leaf nodes that are a destination of the multimedia data frame. For example, in some implementations, the bitmap table may include a bitmap-to-leaf network node mapping. Thus, the bitmap table can be used to translate the bitmap of destination addresses into a plurality of leaf node destination addresses.

The system may identify 330 one or more next leaf nodes that are a destination of the modified multimedia data frame. In some implementations, stage 330 may include identifying the next leaf node destinations may providing the bitmap of destination addresses obtained from the received modified multimedia data frame to a function that accesses a precomputed destination address data-to-next leaf node table and returns one or more next leaf nodes where the modified multimedia data frame should be routed. In some implementations, the destination address data-to-next leaf node table is a bitmap-to-next leaf node table. Alternatively, the next leaf node destinations can be computed at runtime by comparing the destination address data to a routing table at the leaf node such as a bitmap table described herein.

They system may group 340 each of the plurality of destination addresses identified based on the destination address data based on the next leaf node destinations. Grouping each of the plurality of destination addresses identified based on the destination address data includes clustering each destination address under each respective next leaf node destination based on each respective leaf node's hierarchical relationship to the next leaf node. For example, a leaf node that is a child node to a next leaf node destination will be grouped with the next leaf node destination.

The system may determine 350 whether each respective next leaf node is the only remaining leaf network node destination encoded within the destination address of the modified multimedia data frame received at stage 310. The determining stage 350 may include identifying, by the leaf network node that received the modified multimedia data frame at stage 310, a number of subsequent network nodes that are a destination of the at least one modified multimedia data frame. In response to determining that the number of subsequent network nodes is greater than one leaf network node, the leaf network node may generate a modified multimedia data frame that includes (i) data that describes a destination address each of the subsequent network nodes and (ii) a copy of the payload. The data that describes a destination address of each of the subsequent network nodes may include a bitmap of the destination addresses of the subsequent network nodes. Alternatively, in response to determining that the number of subsequent network nodes equal to one leaf network node, the leaf network node may generate a unicast data frame that includes (i) data that describes a destination address of the one subsequent network node and (ii) a copy of the payload. In this scenario, the data that describes a destination address of the one subsequent node includes only a single leaf node destination address.

Figure 4:
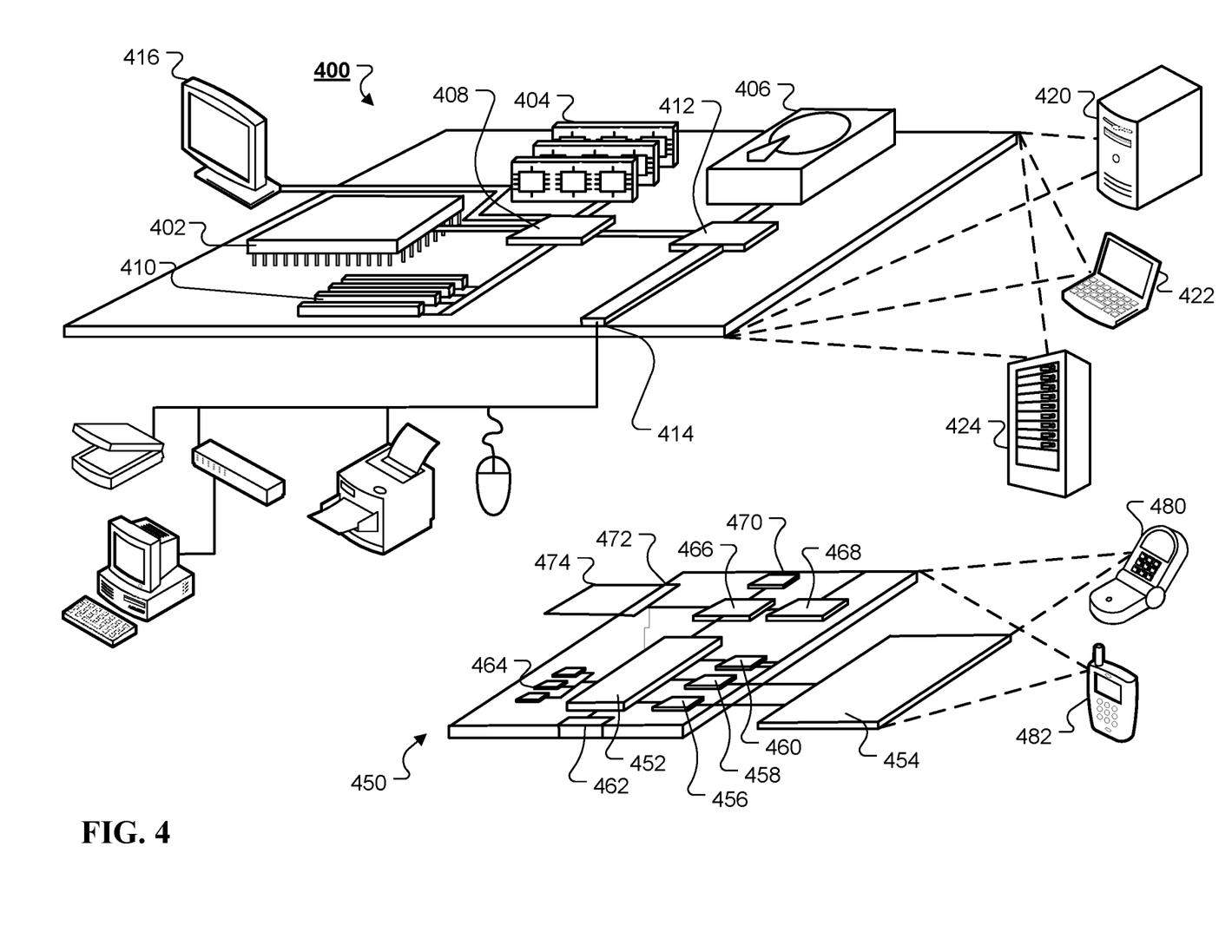
FIG. 4 is a block diagram of components of a system for generating and routing modified multimedia data frames.

FIG. 4 is a block diagram of components of a system for generating and routing modified multimedia data frames.

The computing device 400 is intended to represent various forms of digital computers, such as laptops, desktops, workstations, personal digital assistants, servers, blade servers, mainframes, and other appropriate computers. The mobile computing device 450 is intended to represent various forms of mobile computing devices, such as desktops, laptops, tablets, personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multiprocessor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.\The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. In other implementations, storage device 406 may include one or multiple cloud-based storage devices. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile computing device, such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver. In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, tablet, laptop, desktop, or other similar mobile computing device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:
1. A computer-implemented method comprising:
maintaining, by a first network node, channel membership data that includes data indicating, for each channel of a plurality of channels, leaf node membership for a plurality of channels; and for each channel of the plurality of channels:
  determining, based on the channel membership data, the leaf nodes that are subscribed to access the channel;
  generating, based on the leaf nodes that are subscribed to access the channel, a modified multimedia data frame for the channel that includes (i) a hub node identifier that identifies a hub node that serves one or more of the leaf nodes that are subscribed to access the channel, (ii) data that describes a destination address of each leaf node served by the hub node and that is subscribed to access the channel, wherein at least a portion of the data describes the destination address of each leaf node according to a bitmap in which each bit in the bit map identifies a particular leaf node, the data being a first encoded bitmap of destination addresses; and (iii) a payload; and
  transmitting, by the first network node, as a unicast data frame, the generated modified multimedia data frame to a second network node;
  receiving, at the second network node, the modified multimedia data frame;
  determining, from the first encoded bitmap of destination addresses, child nodes that that each serve at last one or more of the leaf nodes;
  for each of the child nodes:
    generating a respective modified media data frame including respective data that describes the destination address of each leaf node served by the child node and that is subscribed to access the channel, wherein at least a portion of the respective data describes the destination address of each leaf node according to a respective bitmap in which each bit in the bit map identifies only the one or more leaf nodes served by the child node, the respective data being a respective encoded bitmap of destination addresses different from and being a subset of the first encode bitmap of destination addresses and different from each other respective encoded bitmap of destination addresses for each other child node; and
    transmitting, to each child node from the second network node, as a unicast data frame, the respective modified media data frame.

2. The method of claim 1, further comprising:
for each of the plurality of channels:
  in response to determining, based on the channel membership data, that one or more leaf nodes of the plurality of leaf nodes is not subscribed to access the channel, do not generate a modified multimedia data frame for the channel.

3. The method of claim 1,
wherein the modified multimedia data frame includes a MAC Header and a payload,
wherein the MAC Header includes a destination address field.

4. The method of claim 3, wherein each respective modified multimedia data a copy of the payload.

5. The method of claim 3, wherein in response to determining that a number of subsequent network nodes is equal to one network node, generating a unicast data frame that includes (i) data that describes a destination address of the one subsequent network node and (ii) a copy of the payload.

6. A system comprising:
one or more computers and one or more storage devices storing instructions that are operable, when executed by the one or more computers, to cause the one or more computers to perform operations comprising:
  maintaining, by a first network node, channel membership data that includes data indicating, for each channel of a plurality of channels, leaf node membership for a plurality of channels; and
  for each channel of the plurality of channels:
    determining, based on the channel membership data, the leaf nodes that are subscribed to access the channel;
    generating, based on the leaf nodes that are subscribed to access the channel, a modified multimedia data frame for the channel that includes (i) a hub node identifier that identifies a hub node that serves one or more of the leaf nodes that are subscribed to access the channel, (ii) data that describes a destination address of each leaf node served by the hub node and that is subscribed to access the channel, wherein at least a portion of the data describes the destination address of each leaf node according to a bitmap in which each bit in the bit map identifies a particular leaf node, the data being a first encoded bitmap of destination addresses; and (iii) a payload; and
    transmitting, by the first network node, as a unicast data frame, the generated modified multimedia data frame to a second network node;
    receiving, at the second network node, the modified multimedia data frame;
    determining, from the first encoded bitmap of destination addresses, child nodes that that each serve at last one or more of the leaf nodes;
    for each of the child nodes:
      generating a respective modified media data frame including respective data that describes the destination address of each leaf node served by the child node and that is subscribed to access the channel, wherein at least a portion of the respective data describes the destination address of each leaf node according to a respective bitmap in which each bit in the bit map identifies only the one or more leaf nodes served by the child node, the respective data being a respective encoded bitmap of destination addresses different from and being a subset of the first encode bitmap of destination addresses and different from each other respective encoded bitmap of destination addresses for each other child node; and
      transmitting, to each child node from the second network node, as a unicast data frame, the respective modified media data frame.

7. The system of claim 6, the operations further comprising:
for each of the plurality of channels:
  in response to determining, based on the channel membership data, that one or more leaf nodes of the plurality of leaf nodes is not subscribed to access the channel, do not generate a modified multimedia data frame for the channel.

8. The system of claim 7, wherein the modified multimedia data frame includes a MAC Header and a payload.

9. The system of claim 1, wherein each respective modified multimedia data a copy of the payload.

10. The system of claim 1, wherein in response to determining that a number of subsequent network nodes is equal to one network node, generating a unicast data frame that includes (i) data that describes a destination address of the one subsequent network node and (ii) a copy of the payload.

11. A non-transitory computer-readable storage device having stored thereon instructions, which, when executed by a data processing apparatus, cause the data processing apparatus to perform operations comprising:

maintaining, by a first network node, channel membership data that includes data indicating, for each channel of a plurality of channels, leaf node membership for a plurality of channels; and for each channel of the plurality of channels:
determining, based on the channel membership data, the leaf nodes that are subscribed to access the channel;
generating, based on the leaf nodes that are subscribed to access the channel, a modified multimedia data frame for the channel that includes (i) a hub node identifier that identifies a hub node that serves one or more of the leaf nodes that are subscribed to access the channel, (ii) data that describes a destination address of each leaf node served by the hub node and that is subscribed to access the channel, wherein at least a portion of the data describes the destination address of each leaf node according to a bitmap in which each bit in the bit map identifies a particular leaf node, the data being a first encoded bitmap of destination addresses; and (iii) a payload; and
transmitting, by the first network node, as a unicast data frame, the generated modified multimedia data frame to a second network node;
receiving, at the second network node, the modified multimedia data frame;
determining, from the first encoded bitmap of destination addresses, child nodes that that each serve at last one or more of the leaf nodes;
for each of the child nodes:
generating a respective modified media data frame including respective data that describes the destination address of each leaf node served by the child node and that is subscribed to access the channel, wherein at least a portion of the respective data describes the destination address of each leaf node according to a respective bitmap in which each bit in the bit map identifies only the one or more leaf nodes served by the child node, the respective data being a respective encoded bitmap of destination addresses different from and being a subset of the first encode bitmap of destination addresses and different from each other respective encoded bitmap of destination addresses for each other child node; and
transmitting, to each child node from the second network node, as a unicast data frame, the respective modified media data frame.

12. The computer-readable storage device of claim 11, the operations further comprising:
for each of the plurality of channels:
in response to determining, based on the channel membership data, that one or more leaf nodes of the plurality of leaf nodes is not subscribed to access the channel, do not generate a modified multimedia data frame for the channel.

13. The computer-readable storage device of claim 11, wherein the modified multimedia data frame includes a MAC Header and a payload.

14. The computer-readable storage device of claim 11, wherein each respective modified multimedia data a copy of the payload.

15. The computer-readable storage device of claim 11, wherein in response to determining that a number of subsequent network nodes is equal to one network node, generating a unicast data frame that includes (i) data that describes a destination address of the one subsequent network node and (ii) a copy of the payload.

* * * * *